Sept. 15, 1964     A. LA ROY BROWNING     3,148,456

ELECTROSTATIC ACCELEROMETER AND/OR GYROSCOPE

Filed Dec. 8, 1960

INVENTOR.
ALVA LA ROY BROWNING
BY
*Edward A. Scholen*
ATTORNEY

United States Patent Office 3,148,456
Patented Sept. 15, 1964

3,148,456
ELECTROSTATIC ACCELEROMETER AND/OR
GYROSCOPE
Alva La Roy Browning, P.O. Box 597, Goleta, Calif.
Filed Dec. 8, 1960, Ser. No. 74,609
22 Claims. (Cl. 33—204)

This invention relates to guidance apparatus and, more particularly, to apparatus capable of measuring accelerations along three cordinate axes and/or displacements of a vehicle in roll and pitch or yaw, relative to inertial space.

The present application constitutes a continuation-in-part of my copending application Serial No. 779,369 filed December 10, 1958, now abandoned.

In the past, numerous attempts have been made to provide instruments capable of measuring accelerations or displacements of a vehicle relative to inertial space, with a minimum of error and a maximum of precision. Generally, these instruments have suffered from a number of defects. For example, the conventional gyroscope incorporating mechanical bearings and mechanical gimbals suffers from error, due to the resultant frictionally produced precession and drift of the gyroscope. Others, though fairly accurate, are not capable of operating except over a very small range. Still other devices are very sensitive to acceleration and vibration and show a typical unreliability under actual operating conditions. In summation, almost all mechanical or electromechanical devices of this type incorporate one or more very undesirable sources of error and include other inherent and characteristic defects.

Therefore, it is the object of this invention to provide an improved inertial guidance sensing instrument.

It is a further object of this invention to provide, in one configuration, a three-degree-of-freedom electrostatic accelerometer requiring no external power source for primary function.

It is a still further object of this invention to provide, in another configuration, a three-degree-of-freedom electrostatic gyroscope requiring no external power source for primary function.

It is still a further object of this invention to provide a dual purpose instrument that combines both the forementioned functions into a single instrument capable of measuring accelerations along any three-coordinate axes, simultaneously, with the measurement of roll and pitch or yaw of a vehicle airframe. This, being accomplished without requiring any external power source for primary function.

It is an additional object of this invention to provide a configuration allowing the support, in stable equilibrium, of an electrically charged body in a dynamic electrostatic field without the necessity of any external circuitry or power source.

According to this invention, there is provided an instrument capable of measuring accelerations along any three-coordinate axes or displacements in roll and pitch or yaw, or both simultaneously. The indicating method, or pickoff, may be accomplished in several ways; basically relying upon electrostatic or magnetic measurements, or measurements of the variations in the intensity of nuclear radiation from a radioactive source. The instrument is made operative, basically, by the suspension of a usually spherical inertial sensing mass and/or gyro rotor in a condition of stable equilibrium contained within and relative to a larger and outer sphere. This suspension is accomplished by virtue of the static and dynamic electrostatic fields produced and maintained by the emission and subsequent absorption of alpha and beta particles from the central inertial sensing mass and/or gyro rotor. The nuclear particles have their origin in radioactive sources contained within the central sphere.

Under normal circumstances, and relative to the past state of the art, it is not possible to suspend an electrically charged body in a condition of stable equilibrium in an electrostatic field when utilizing electric forces only. However, in accordance with the present invention, by utilizing radioactive source materials, beta and alpha emitters located, primarily, in the central inertial sensing mass or sphere and/or gyro rotor, it is possible to suspend an electrically charged body in a condition of stable equilibrium, relative to a larger outer sphere or hemisphere, without external circuitry or external power sources being required to supply the required energy. This is accomplished by virtue of the emission and subsequent absorption of electrically charged particles within the device and, also, geometrical considerations. The normally symmetrical electrostatic field, developed between the smaller inner sphere and the larger outer sphere, no longer retains its symmetry when the smaller central sphere is displaced by some acceleration. The charged particle emission, combined with geometrical considerations, results in a restoring force being developed equal in magnitude, but opposite in direction to the displacing force, so that a condition of stable equilibrium exists for the charged central sphere relative to the outer and larger sphere.

It is also possible, by using the same methods of electrostatic suspension, to suspend a free gyro rotor, utilizing the directional leakage of electrical charges from the central sphere to produce rotation of the central sphere relative to the outer and larger sphere. This configuration represents a free-floating gyroscope, where the energies to produce angular rotation are supplied by the decay of radioisotopes. The two normally separate functions, that of accelerometer and gyroscope, are combined into a single device capable of measuring five variables; accelerations along three coordinate axes and roll and pitch or yaw, simultaneously, using two separate methods of pickoff for each function. The combination affords an instrument which is compact, free from frictionally induced error, independent of external power supplies, (except in pickoff), has wide range in sensitivity and permissible accelerations, and is free from maintenance problems.

The features of the present invention, which are believed to be novel, are set forth with particularity in the appended claims. The present invention, both as to its organization and advantages thereof, may best be understood by reference to the following description, taken in connection with the accompanying drawings in which:

FIGURE 1 is a sectional view, showing an electrostatic accelerometer and/or gyroscope according to this invention, including the normal, "at rest," distribution of electrostatic charges in the configuration.

FIGURE 2 shows the redistribution of electrical charges that takes place when sphere 1 is displaced from the exact geometrical center of sphere 2. This redistribution is due to geometrical considerations combined with the uniform and symmetrical beta and alpha emission from sphere 1, in addition to absorption of alpha and beta radiation emitted from sphere 1.

Figure 1:
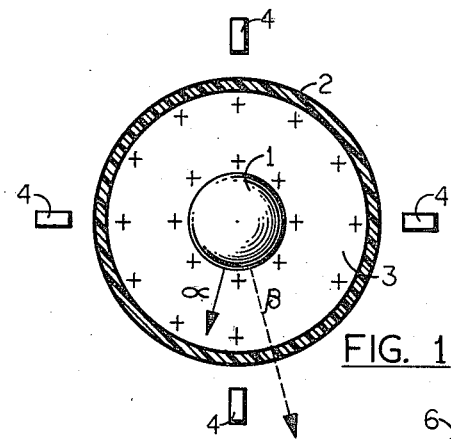

In FIGURE 1, a central sphere 1, either hollow or solid, or cellular, is enclosed by a larger diameter outer stationary sphere 2. The sphere 1 is of dielectric or semiconductive material and may, for example, be of polystyrene. The sphere 2 is of dielectric or semiconductive material and may, for example, be of Teflon. The sphere 2 may be actually in the form of a hemisphere but in such case the restoring forces developed as described later are lessened. One or more types of radioactive materials are combined, physically and uniformly, with the central sphere 1. These isotopes are chosen so that they will emit both beta and alpha particles preferably uniformly and symmetrically from the surface of sphere 1. The ratio of the emissions are such that a greater number of beta particles are emitted from sphere 1 than alpha particles from sphere 1. For these purposes the sphere may have a diameter 0.195 inch, approximately 5/32" diameter, and may weigh a total of 1.5 milligrams with the isotopes thereon, the weight of the isotopes being insignificant with respect to the weight of the material of the sphere on which the isotope is disposed. The isotopes, which are coated on the outer surface of the sphere, are Polonium 210 and Strontium 89 in the ratio of 4 parts Strontium 89 to 1 part Polonium 210, the Strontium 89 being the beta ray emitter and the Polonium 210 coated on the outside of the Strontium 89 being the alpha particle emitter. The space 3 is either a vacuum or filled with a suitable gas at some pressure as, for example, a vacuum of $10^{-2}$ to $10^{-3}$ millimeter of mercury, a partial vacuum being preferred to avoid excess attenuation and/or scattering of alpha particles and beta rays. The beta particles emitted from sphere 1, because of their greater penetrating qualities, penetrate through the material of sphere 2 which has an outside diameter of one-half inch and a wall thickness as thin as practically possible, as, for example, one to fivethousandths (.001"–.005") of an inch. Because of this greater penetration, the greater part of the beta particles pass through sphere 2. For each beta particle that leaves the surface of sphere 1, a corresponding positive charge appears on the surface of sphere 1, so that the sphere 1 is positively charged. However, sphere 1 also contains an alpha particle source so that for each alpha particle emitted outwardly from the surface of sphere 1, two negative charges appear on the surface of sphere 1. The ratio of emission is so balanced that there are three or more beta particles for each alpha particle emitted outwardly from sphere 1, with the result that there is a net positive charge continuously developed on sphere 1. This condition assures a predominantly positive electrostatic charge on sphere 1, at all times, that is dependent in intensity upon the emission ratio and rate, diameter of sphere 1 and the electrical leakage or exchange rate of charge through the partial vacuum or gas contained in space 3.

The alpha particles emitted from sphere 1 are, because of their lesser penetrating power, absorbed in the dielectric inner surface of sphere 2 and charged the such inner surface of sphere 2 positively. This distribution of electrical charges, at any one instant of time, results in an electrostatically charged positive inner sphere 1, with positive charges appearing on the outer surface of sphere 1 and also on the inner surface of sphere 2. Thus, a potential gradient exists between the inner and outer spheres, the inner sphere 1 being more positively charged than the inner surface of the outer sphere 2 but since the surface area of outer sphere 2 is greater, the gradient is between the inner sphere and outer sphere. For any given dimensions and material and gas pressure configuration, this potential gradient builds up until such time that the charge leakage rate between the spheres and surroundings, i.e. ground, exactly equals the emission and generation rate of charge produced by the decay of radioisotopes or radioisotope contained on sphere 1. There should be sufficient leakage to maintain this equilibrium condition without development of spark discharges.

Figure 2:
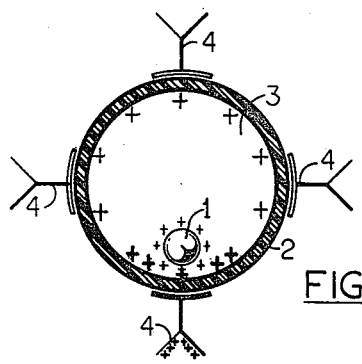

The devices 4 in FIGURE 1 (only four shown in the two dimensional drawing), represent sensing elements fixed, relative to sphere 2, along any three-coordinate axes. The purpose of these sensing devices 4 is to measure the magnitude and direction of displacement of the central sphere 1 relative to sphere 2. Several mechanisms may be used to accomplish this pickoff. One possible method is to measure the variation of electrical charge over the exterior surface of sphere 2 (as indicated in FIGURE 2), this being an indication of the position of sphere 1 relative to sphere 2. This type of pickoff can be accomplished by a method similar to the principles concerned in the vane electrostatic voltmeter where potential measurement is dependent upon the mutual repulsion of similar charges. Another pickoff method, accomplished without absorbing energy from the central sphere is to detect the external or internal radiation flux or intensity over the inner or outer surface of sphere 2. In this instance, the detectors or sensors 4, would be a type of ionization detector, Geiger tube, or scintillation counter.

The object of this configuration is the electrostatic suspension of the central dielectric sphere 1 in a condition of stable equilibrium relative to sphere 2. In normal circumstances, this condition is impossible as the total resultant force exerted on an electrical test charge at any point within the surface of a symmetrical and homogeneous sphere of electrical charge is zero, so that a "neutral" field exists within the sphere. This statement is true for static fields, but not necessarily for dynamic or fluctuating electrical fields. There are other theoretically acceptable methods of charged body support utilizing external circuitry with more or less stable equilibrium conditions produced. However, these commonly recognized methods suffer from almost insolvable practical difficulties so that the value of these concepts to the guidance problem is questionable. The requirements for stable equilibrium, in this configuration, are that a test charge or a charged body, sphere 1, experiences a zero resultant force of repulsion when in the exact geometrical center of sphere 2, but when the central sphere 1 is displaced by the inertial effect of some acceleration or accelerations, a restoring force must be developed equal in magnitude and opposite in direction to the original displacing force. In the normal configuration, relying upon static fields and fixed charges, this is impossible. However, in the presently discussed arrangement, it can readily be seen that when sphere 1 moves, some finite distance from the center of sphere 2 toward the inner wall of sphere 2, that the heretofore symmetrical and homogeneous distribution of charge throughout sphere 2, is no longer uniform or symmetrical. The method of producing and maintaining the electrostatic charges and field gradients has already been discussed, and it can be seen, by reference to FIGURE 2, that, due to geometrical reasons and reasons of absorption of radiation by gas molecules in space 3, there develops a greater concentration of electrical charge on the inner and outer surface of sphere 2 in the area which, and towards which sphere 1 moves, due to some inertial displacing force. A restoring force, due to the repulsion of similar charges, is then developed, which is equal in magnitude and opposite in direction to the original displacing force exerted upon the inertial sensing mass or sphere 1 in any direction. This restoring force is due to the repulsion of similar electrical charges and is due further, in this device, to the symmetrical and uniform emission of charged particles from the surface of sphere 1, and the physical fact that the electrical repulsive forces and electrostatic fields are increased in intensity when, and in the area of least separation, between outer surface of sphere 1 and inner surface of sphere 2.

It must be realized that any displacement of sphere 1, from the exact geometrical center of sphere 2, will cause a resultant unsymmetrical distribution of electrical charges over the inner and outer surface of sphere 2, and a restoring force that will tend to return the sphere 1 to a position in the center of sphere 2. The redistribution of electrical charge potential is not due to the migration of electrical charges on the inner and outer surface of sphere 2, but is due to positive charge emission from sphere 1 being absorbed within the material of sphere 2 and, to a lesser extent, is due to the partial absorption of alpha particles in space 3.

FIGURE 2, as before mentioned, shows the distribution of electrical charges produced by the displacement of the central inertial sensing sphere 1 from the center of sphere 2. FIGURE 2 also depicts the forementioned method of utilizing principles similar to those used in the electrostatic voltmeter to measure a variation of the electrical potential over the surface of sphere 2. In this pickoff configuration, a displacement of sphere 1 produces a corresponding concentration of positive electrical charge on the inner surface of sphere 2 and negative electrical charge induced on the exterior electrode surface of detector 4 along the axis of displacement or motion of sphere 1. This increase in charge on the surface of sphere 2 will induce an opposite charge on electrical conductor 4. This induced charge will in turn increase the number of opposite charges on the vanes of the indicator 4 and, thus, increase the separation of the vanes due to the greater electrical repulsive force developed between them. The increase in electric or electrostatic field intensity on the surfaces of the sphere 2, is, thus, a measurement of the displacement in the direction and magnitude of the central inertial sensing mass or sphere 1.

It is to be noted that some care must be used in controlling the electrical leakage or exchange rate of charge from the exterior surface of sphere 2 to the interior surface of sphere 2 and, thusly, to sphere 1. This exchange rate of charge is fairly constant with time. If the leakage rate is kept constant with time, the electrical field potentials generated within the device will also be constant over periods of time governed by the half-lives of the radioisotopes incorporated into the configuration.

Figure 3:
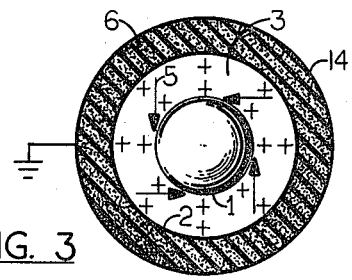
FIGURE 3 is a view of the device showing the force vectors, due to directional leakage of electrical energy, producing the angular rotation of the central sphere in its gyroscope or combined accelerometer and gyroscope application.

In FIGURE 3, the elements shown are identical with those shown in FIGURES 1 and 2. In this configuration, provision is made to utilize the energy of radioactive decay to produce angular rotation of the electrically charged and supported sphere 1 relative to the outer sphere 2. The object of this configuration being to utilize the gyroscopic properties of a rotating body to sense displacements of the outer sphere 2 relative to the axis of rotation and, thus, inertial space. The rotational energy is supplied to the sphere 1, FIGURE 3, or rotor, by virtue of the directional leakage or exchange of electrical charge relative to sphere 1. In this configuration, the central sphere 1 is so shaped that the required electrostatic leakage or exchange of charge shall be directional and capable, by virtue of Newton's third law of motion, of imparting an angular velocity to the central sphere 1. It is known that the electrical potential upon a body is a function of its radius at any point on the surface. The greater the radius of curvature, the greater the concentration of charge. The sphere 1, by virtue of its emission of charged particles and because of the insulating properties of the vacuum or gas in space 3, quickly builds up a high electrical potential. The resultant electrical charge, usually positive for sphere 1, must be dissipated at a constant rate through the partial vacuum or gas of space 3 in order to keep a fairly constant potential on the surface of sphere 1 relative to the surfaces of sphere 2. This directional leakage is similar to that observed in the electrostatic pinwheel. The rotational energy for the pinwheel originates in the reaction forces developed due to the emission of charge or the absorption of charge from the surrounding gaseous environment. In the present discussed configuration, the situation is similar excepting that the surplus of electrical charge originates, not with external circuitry, but is due to the generation of high potentials by virtue of the emission of charged particles from a radioelement contained within an insulated body. The central sphere 1, or gyro rotor, in this configuration will contain vanes, sharp points or edges, so that electrical charge leakage is directional with respect to the central sphere. The force vectors 5 developed, due to the reaction forces, are as shown in FIGURE 3 and in such a direction relative to sphere 1 as to produce the required angular rotation of sphere 1 relative to sphere 2. As illustrated, a grounded conducting sphere 14 is provided to absorb and ground effects due to beta rays and the same may be filled with material 6 like foam polystyrene which is transparent to beta radiation.

It is to be noted that a method of pickoff is readily made available due to the fact that a charged body in rotation produces an external magnetic field. In this instance, the resultant magnetic field produced by the rotation of electrically charged sphere 1 is external to sphere 2 so that a displacement of the sphere 2, and the vehicle airframe, relative to the axis of rotation of sphere 1 and inertial space, can be measured in magnitude and direction by noting the angle the magnetic lines of force make with a fixed frame of reference relative to the surface of sphere 2. It is also possible to utilize the radiation method of pickoff in this application by providing suitable sensors within sphere 14. However, in this case, a tight directional beam of penetrating radiation, such as betas from Strontium 90, is parallel to the axis of rotation of sphere 1. The radiation beam can, thus, be detected external to the surface of sphere 2. The position of the pickoff radiation beam relative to the surface of sphere 2 is a measure of the displacement of sphere 2, or vehicle airframe, with the axis of rotation of sphere 1 and, thus, inertial space.

For operation of the instrument as a combined accelerometer and gyroscope, capable of sensing accelerations along any three-coordinate axes, simultaneously, with displacements of a vehicle airframe in roll and pitch or yaw, no significant changes are made excepting the non-rotating sphere 1 of the accelerometer, FIGURE 1, is made to rotate by the above mentioned methods as shown in FIGURE 3. In this dual function, two separate pickoff methods are used; each being independent of the other. One pickoff method detects any displacement, in magnitude and direction, of the central sphere 1 from the center of sphere 2. This is a measure of the total resultant acceleration forces acting on the sensing element and thus, the vehicle airframe. The position of sphere 1, at any instant of time, will be due to the resultant of all acceleration forces, including the acceleration of gravity acting on the central inertial sensing mass 1 at any one instant of time. Variations in roll and pitch or yaw, or displacement of the surface of sphere 2 (and the vehicle airframe) with respect to inertial space, can be detected by measuring the direction of the magnetic flux lines originating with sphere 1, made with a fixed frame of reference on the surface of sphere 2. The radiation method, before mentioned, may also be used in this application. It will be noted that the function of the device as an accelerometer does not appreciably interfere with its function as a free floating gyroscope and vice versa. In actual practice, the dimensions of the dual purpose instrument will be reduced and the central sphere 1 shall be somewhat less sensitive to small acceleration and vibrations.

Damping of the central sphere can be accomplished by a number of methods. For example, regulating the gas pressure in order to control the exchange rate of charge between spheres 1 and 2. This results in the device becoming self-damping as electrical potential and the restoring forces developed, will become a function of the displacement and the rate of displacement of sphere 1. Another method is represented by taking advantage of the resultant magnetic field produced when the electrically charged central sphere 1 is in motion, due to a displacing force being applied. It is possible to absorb excess energy by the interaction of magnetic fields. Governing the angular velocity of rotation, in the dual purpose instrument, can also be accomplished by interaction of magnetic fields produced by the electrically charged rotating sphere 1 with external circuitry. Gas pressure and aerodynamic drag also lends itself well to governing.

Naturally, the radioactive materials chosen for incorporation into this instrument shall be those with the longest half-life permissible so that recalibration will not be required except over appreciable periods of time. When recalibration of such a device is required, it can be accomplished in the external circuitry, concerned with the pickoff equipment.

Figures 4, 5:
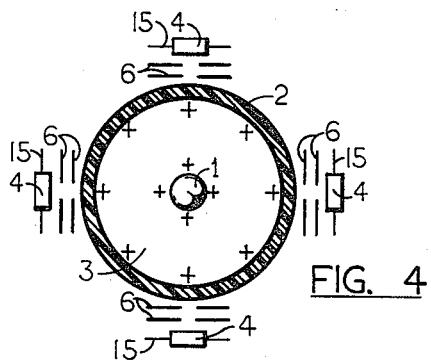
FIGURES 4 and 5 illustrate other forms of readout systems in accordance with other features of the invention.

FIGURE 4 illustrates a readout system sensitive to directional beta rays from source 1 for locating or detecting the position of sphere 1. The detectors 4 are beta radiation counters each receiving radiation from different directions through corresponding slit systems 6 and the output of the detectors 4 conveyed over wires 15 are compared one with the other by using suitable means to indicate the position of sphere 1 relative to sphere 2.

FIGURE 5 illustrates an optical readout system wherein light from light source 24 is projected through slit system 8 onto a partially silvered mirror 25 through partly silvered mirror 25 which allows light transmission and also provides some light reflection in the direction of sphere 1 and also in the direction of detector 27 which may comprise two photocell circuits having corresponding output voltages 29, 30 which are compared by suitable means to indicate the position of sphere 1 in stationary sphere 2. One of these outputs, as indicated by the arrows in FIGURE 5, corresponds to light transmitted through mirror 25, and then reflected in turn by mirror 26 and mirror 25 onto detector means 27; and the other output coresponds to light reflected by mirror 25 onto sphere 1 which reflects light back through mirror 25 onto detecting means 27.

Figure 6:
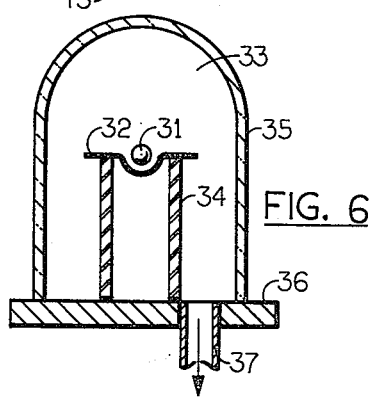
FIGURE 6 illustrates a modified form also embodying the present invention.

FIGURE 6 illustrates diagrammatically an actual laboratory setup which has proven the principles of self-support of sphere 1. In this case, the bell jar 35 on support 36 is evacuated through opening 37 to provide an evacuated space 33 within which the semisphere 32 of Teflon is supported on a ceramic cylinder 34. The ball 31 of the dimensions and coated as above described is self-supported generally within the confines of the semisphere 32 solely due to the charges developed as previously described.

Thus, it may be seen that there has been provided an instrument which is capable of performing the dual functions of measuring accelerations relative to inertial space, simultaneously, with measuring displacements of a vehicle airframe in roll and pitch or yaw relative to inertial space. It is capable of performing either of these functions or both simultaneously, being self-contained, rugged, reliable and free from external power source and maintenance problems.

It may also be seen that there has been provided a practical physical configuration that will allow an electrical charge or charged body to be suspended in a state of stable equilibrium.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. An accelerometer including: an electrically charged inertial sensing mass having radioactive material thereon and means whereby said mass is freely supported by electrical forces in a condition, or state, of stable equilibrium, said means including said radioactive material to supply the required electrical supporting forces and restoring forces; and a common casing enclosing said inertial sensing mass.

2. A gyroscope including: an electrically charged and supported gyroscope rotor, and means whereby said rotor is electrically suspended and supported in a state of stable equilibrium, said means including radioactive material on said rotor to supply the required electrical field potentials for supporting said rotor, restoring forces and rotational energy for the gyroscope rotor; and a common casing enclosing said gyroscope rotor and said radioactive material.

3. A combined instrument for the measurement of accelerations in any direction, simultaneously, with the measurement of roll and pitch or yaw of a vehicle relative to inertial space including: an electrically supported and charged inertial sensing mass and gyroscope rotor, a means to support said mass and rotor in a state of stable equilibrium, a radioactive source of electrical potential supplying rotational energy for said inertial sensing mass and gyroscope rotor, said radioactive source being integral with said sensing mass a common casing enclosing said inertial sensing mass, said gyroscope rotor and said radioactive source; and a means whereby a displacement of said mass and rotor is detected.

4. A physical configuration for the stable equilibrium electrical suspension of an electrically charged body including: an electrically charged body, said body having radioactive material emitting beta rays and alpha particles thereon; an insulating medium; an outer casing enclosing said body whereby the electrical potential difference between the inner and outer surface of the casing and the electrically charged body respectively is dependent upon the position of the charged body, relative to the outer casing, said charged body being a uniformly symmetrical point source emitter of positively and negatively charged particles originating from said radioactive material; and said casing for said charged body being thin enough to permit the negatively charged beta particles emitted from the central charged body to penetrate through to the exterior surface of said casing, the positively charged alpha particles emitted from the central charged body being absorbed in said casing, thereby generating an electrical potential difference between the exterior and interior surfaces of said casing and the central electrically charged body contained by the casing; and means for detecting the displacement of the central charged body.

5. An electrostatic accelerometer including: an electrostatically supported spherical inertial sensing mass enclosed by a larger diameter spherical casing; a source of charging potential, said source including radioactive material on the forementioned inertial sensing mass and emitting both alpha and beta particles uniformly and symmetrically from the surface of said sensing mass, and a means for detecting the magnitude and direction of the movements of said inertial sensing mass relative to said outer casing.

6. The subject matter of claim 2 in which said rotor has raised regions thereon whereby an angular force is developed producing rotation of said gyroscope rotor relative to said outer and common casing, said rotational force being due to the directional leakage or absorption of excess electrical charge produced on the gyroscope rotor by the decay of suitable radioisotopes contained therein; a means of detecting a displacement of the said common casing relative to the axis of rotation of the gyroscope rotor and, thus, inertial space.

7. A combined instrument for the measurement of accelerations simultaneously with the measurements of roll and pitch or yaw of a vehicle relative to inertial space including: an electrically charged and supported inertial sensing mass and gyroscope rotor, said rotor being suspended in a casing, said mass and gyroscope rotor physically containing radioisotopes so that the said mass and rotor are electrically charged by virtue of the emission of alpha and beta particles from the said radioisotopes, said rotor and said casing providing a means of electrical suspension, in stable equilibrium, for said mass and rotor by virtue of the emission and subsequent absorption of the forementioned alpha and beta particles in and upon the surfaces of said casing; an insulating medium between said rotor and said casing whereby the said mass-rotor is partially insulated from the said outer casing, a means of producing rotation of the said mass-rotor by virtue of the directional leakage of electrical charge from said mass-rotor to the forementioned outer casing, said radioisotopes providing a means of establishing an electrical potential difference and repulsive force between said mass-rotor and the inner and outer surface of said casing and developing a potential difference between the same in any particular portion of the mass-rotor relative to the said outer casing; a means of detecting a displacement of the said mass-rotor relative to the forementioned outer casing.

8. Apparatus as set forth in claim 4 in which said detecting means is responsive to the resultant redistribution of electrical charge on said casing.

9. Apparatus as set forth in claim 4 in which said detecting means comprises means responsive to variations in radiation intensity over the surface of the outer casing.

10. An accelerometer as set forth in claim 5 in which the space between said mass and said casing is evacuated.

11. An accelerometer as set forth in claim 5 in which the space between said mass and said casing is filled with gas under pressure.

12. An accelerometer as set forth in claim 5 in which said detecting means is responsive to variations in the radiation flux.

13. An accelerometer as set forth in claim 5 in which said detecting means is responsive to electrical charge distribution on the outer casing.

14. An accelerometer as set forth in claim 5 including means on said sensing mass interacting with emanations from said radioactive material for producing rotation of said sensing mass.

15. Apparatus as set forth in claim 6 in which said detecting means is responsive to displacement of magnetic lines of flux produced by rotation of the electrically charged rotor with respect to a reference system fixed relative to the casing.

16. Apparatus as set forth in claim 6 in which said detecting means is responsive to a tight and limited radiation beam paralleling the axis of rotation.

17. Apparatus as set forth in claim 7 in which said detecting means is responsive to the resultant variation in electrical charge density over the exterior surface of the outer casing.

18. Apparatus as set forth in claim 7 in which said detecting means is responsive to a variation in radiation intensity originating in the mass rotor relative to the outer casing.

19. Apparatus as set forth in claim 7 in which said detecting means includes means responsive to external magnetic lines of flux produced by rotation of the electrically charged mass rotor.

20. Apparatus as set forth in claim 7, in which said detecting means includes means responsive to a radiation beam having its origin in and being parallel to the axis of rotation of the central mass rotor.

21. Motion sensing apparatus comprising an inner sphere, an outer sphere encircling said inner sphere, radioactive material means on said inner sphere for rendering the same radioactive and maintaining the inner sphere in a supported condition within said outer sphere.

22. Apparatus as set forth in claim 21 including means for detecting relative movement between said inner and outer spheres.

References Cited in the file of this patent

UNITED STATES PATENTS

| 2,552,050 | Linder | May 8, 1951 |
| 3,003,356 | Nordsieck | Oct. 10, 1961 |
| 3,024,364 | Wanetick | Mar. 6, 1962 |

OTHER REFERENCES

AEC—"Summary of Available Data on Radiation Damage to Various Non-Metallic Materials," Apr. 2, 1952 (pp. 1 to 50, p. 17 relied on).